US012668692B2

(12) United States Patent
Yamasaki et al.

(10) Patent No.: US 12,668,692 B2
(45) Date of Patent: Jun. 30, 2026

(54) RESIN COMPOSITION AND POWER CABLE

(71) Applicant: SUMITOMO ELECTRIC INDUSTRIES, LTD., Osaka (JP)

(72) Inventors: Satoshi Yamasaki, Osaka (JP); Fumitoshi Iyoda, Osaka (JP); Takanori Yamazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 587 days.

(21) Appl. No.: 18/034,822

(22) PCT Filed: Oct. 26, 2021

(86) PCT No.: PCT/JP2021/039407
§ 371 (c)(1),
(2) Date: May 1, 2023

(87) PCT Pub. No.: WO2022/137781
PCT Pub. Date: Jun. 30, 2022

(65) Prior Publication Data
US 2023/0407070 A1 Dec. 21, 2023

(30) Foreign Application Priority Data
Dec. 21, 2020 (JP) ................................. 2020-211491

(51) Int. Cl.
C08L 23/12 (2006.01)
C08K 5/132 (2006.01)
(Continued)

(52) U.S. Cl.
CPC .............. C08L 23/12 (2013.01); C08K 5/132 (2013.01); C08L 23/16 (2013.01); C08L 25/08 (2013.01);
(Continued)

(58) Field of Classification Search
CPC ........... C08K 5/13; C08K 5/132; C08L 23/10; C08L 23/12; C08L 23/16
See application file for complete search history.

(56) References Cited

U.S. PATENT DOCUMENTS 3,462,517 A * 8/1969 Russell .................... C08K 5/20
524/226
6,005,192 A * 12/1999 Mashikian ........... H01B 7/2813
174/110 AR (Continued)

FOREIGN PATENT DOCUMENTS

JP S57-069611 A 4/1982
JP 2012-119196 A 6/2012
(Continued)

OTHER PUBLICATIONS

Brown et al. Submerged Medium Voltage Cable Systems at Nuclear Power Plants: A Review of Research Efforts Relevant to Aging Mechanisms and Condition Monitoring Mar. 2015 (Year: 2015).*

(Continued)

*Primary Examiner* — Mark S Kaucher
(74) *Attorney, Agent, or Firm* — Renner, Otto, Boisselle & Sklar, LLP

(57) ABSTRACT
A resin composition, including: a resin component containing propylene units, and a resistance-imparting agent, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

9 Claims, 1 Drawing Sheet

10

(51) Int. Cl.
  *C08L 23/16* (2006.01)
  *C08L 25/08* (2006.01)
  *H01B 3/44* (2006.01)

(52) U.S. Cl.
  CPC ........ *H01B 3/441* (2013.01); *C08L 2203/202*
    (2013.01); *C08L 2205/025* (2013.01); *C08L*
    *2205/03* (2013.01); *C08L 2207/04* (2013.01)

(56) References Cited

U.S. PATENT DOCUMENTS

| | | | | |
|---|---|---|---|---|
| 2013/0233604 A1* | 9/2013 | Perego | ................... | H01B 3/441 |
| | | | | 174/26 R |
| 2013/0264091 A1 | 10/2013 | Watanabe | | |
| 2016/0362566 A1 | 12/2016 | Shimizu et al. | | |
| 2018/0025957 A1* | 1/2018 | Ouchiyama | .......... | H01L 23/293 |
| | | | | 264/261 |
| 2018/0362749 A1* | 12/2018 | Perego | ..................... | H01B 3/22 |
| 2023/0399500 A1* | 12/2023 | Yamasaki | .............. | H01B 3/441 |

FOREIGN PATENT DOCUMENTS

| | | |
|---|---|---|
| JP | 2015-162929 A | 9/2015 |
| JP | 2017-128677 A | 7/2017 |
| WO | 2021/101753 A1 | 5/2021 |

OTHER PUBLICATIONS

Scifinder webpage for CAS registry No. 110553-27-0 (Year: 2025).*
Adeka, Polymer Additives, ADK STAB, Product List, Polymer Additives, ADK STAB, ADEKA Corp., pp. 1-14, Nov. 24, 2021, with English explanation of relevance.
Ouchi Shinko Chemical Industrial, Rubber chemicals, antioxidants and bishpenols, Product Guide, 300 (NOCRAC 300), Nov. 22, 2021, with English explanation of relevance.

* cited by examiner

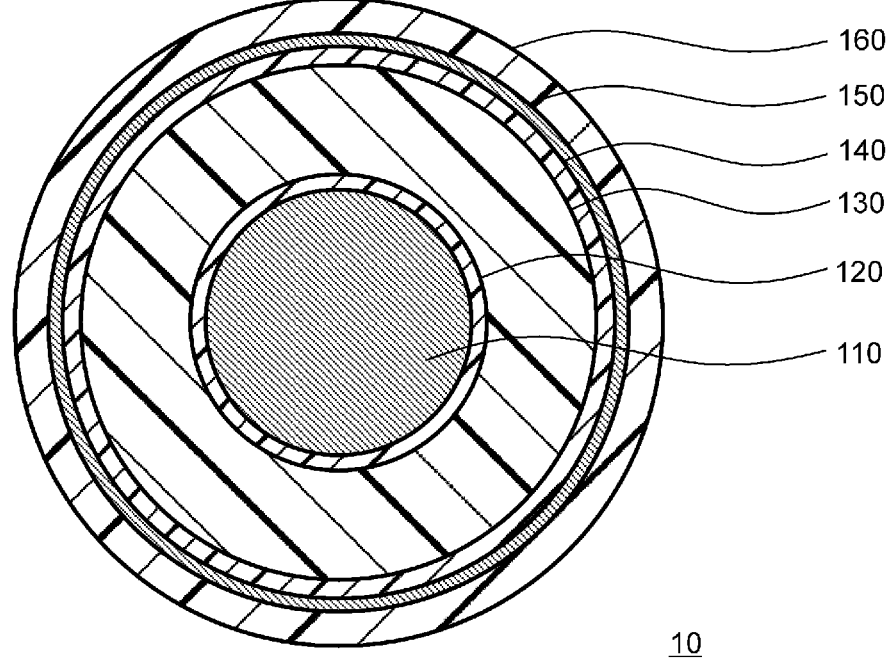
160
150
140
130
120
110
10

RESIN COMPOSITION AND POWER CABLE

TECHNICAL FIELD

The present application claims priority based on Japanese Laid-Open Patent Publication No. 2020-211491 filed on Dec. 21, 2020, the content of which is incorporated herein by reference in its entirety.

The present disclosure relates to a resin composition and a power cable.

BACKGROUND ART

Cross-linked polyethylene is excellent in insulation, and therefore has been widely used as a resin component included in an insulating layer in a power cable and the like (e.g., PTL. 1).

CITATION LIST

Patent Literature

[PTL. 1] Japanese Laid-Open Patent Publication No. S57-69611

SUMMARY OF INVENTION

Solution to Problem

According to an aspect of the present disclosure, there is provided a resin composition, including:

a resin component containing propylene units, and a resistance-imparting agent, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

According to another aspect of the present disclosure, there is provided a power cable, including:

a conductor, and an insulating layer coated on an outer circumference of the conductor, wherein the insulating layer is formed from a resin composition, the resin composition includes a resin component containing propylene units, and a resistance-imparting agent, the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content ratio of the resistance-imparting agent is 0.4 parts by mass or more and 10 parts by mass or less with respect to 100 parts by mass of the resin component, and a content of metal impurities is 0.02% by volume or less.

BRIEF DESCRIPTION OF DRAWINGS

FIG. 1 is a schematic cross-sectional view orthogonal to an axial direction of a power cable according to an embodiment of the present disclosure.

DESCRIPTION OF EMBODIMENTS

Problem to be Solved by Disclosure

Cross-linked polyethylene which has been degraded over time cannot be recycled and has no choice but to be incinerated. For this reason, there is concern about the influence on environment.

In recent years, as resin components included in the insulating layer, propylene-containing resins (hereinafter also referred to as "propylene-based resins") have attracted attention as the resin components included in the insulating layer. The propylene-based resins, even non-cross-linked ones, can achieve a high insulation. In other words, both the insulation and recyclability can be achieved. In addition, use of the propylene-based resin can improve handling, processability, and ease of manufacture.

However, the use of the propylene-based resin as the resin component included in the insulating layer may fail to provide an insulation inherent in the propylene-based resin in some cases.

An object of the present disclosure is to provide a technique that can improve an insulation of a resin composition including a propylene-based resin.

Advantageous Effect of Disclosure

According to the present disclosure, an insulation can be improved in a resin composition containing the propylene-based resin.

Description of Embodiment of Disclosure

Knowledges Obtained by the Inventors

First, an outline of the knowledges obtained by the inventors will be described.

In general, the propylene-based resin has a large amount of crystals and tends to form coarse crystals. Therefore, when the insulating layer is formed only from the propylene-based resin, the insulating layer tends to be hard. For this reason, when the propylene-based resin is used as the resin component included in the insulating layer, it is necessary to control the crystallinity of the propylene-based resin by mixing a low-crystallinity resin therein.

When the present inventors formed an insulating layer with a propylene-based resin having reduced crystallinity, the insulation varied in some cases of producing the power cable. Therefore, the insulation inherent in the propylene-based resin cannot obtained in some cases.

The present inventors have investigated this point, and have found that such variation in the insulation results from foreign materials introduced in the resin composition during the production process of the power cable. Examples of the foreign material include metal impurities such as finely divided metal powder derived from a metallic conductor, and carbide (umber) generated by burning the resin component. Among these foreign materials, especially metal impurities affect the insulation, sometimes resulting in greatly varied insulation of the power cable depending on the amount of the impurities introduced therein.

Since metal impurities poorly adhere to the resin component, they bring about a sharp change in resistance at an interface with the resin component, thereby reducing the insulation. In addition, when the metal impurity has a protruding shape, the electric field is more likely to be concentrated and the insulation is more likely to be degraded.

As described above, in the insulating layer including the propylene-based resin, variation in the insulation may occur due to the metal impurities introduced during the production process.

The present inventors have studied the above-described problems. As a result, the present inventors have found that an addition of a certain additive can reduce variation in the insulation. Such an additive is a monomer that is used as an antioxidant, has a phenol skeleton with hydrogen or an alkyl group having 1 to 3 carbon atoms, bonded to at least one of ortho positions to the hydroxyl group of the phenol skeleton, and has a molecular weight of 200 or more and 500 or less and a melting point of 215° C. or less, which is lower than the heat-mixing temperature of the propylene-based resin.

The above-described monomer has been commonly used as an antioxidant. However, according to the study by the present inventors, it is found that since the monomer has a chemical structure with high affinity for the metal impurities and a predetermined molecular weight and melting point, it can melt at the time of heat-mixing of the resin composition and coat the surface of the metal impurities. It coats the surface, thereby to mitigate the sharp change in resistance at the interface between the metal impurities and the resin component and to reduce concentration of electric field to the metal impurities. As a result, the degradation of the insulation due to the metal impurities can be reduced. That is, the above-described monomer acts not only as an antioxidant, but as a resistance-imparting agent that imparts resistance to the insulating layer against degradation of the insulation due to the metal impurities.

Further, it is found that degradation of the insulation due to the metal impurities introduced in the resin composition can be reduced by blending a predetermined amount of the above-described compound into the resin composition including the propylene-based resin.

The present disclosure is based on the above-described knowledges found by the inventors.

Embodiments of Disclosure

Next, embodiments of the present disclosure will be listed and described.

[1] A resin composition according to an aspect of the present disclosure includes:

a resin component containing propylene units, and a resistance-imparting agent, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

According to this configuration, the insulation of the resin composition including the propylene-based resin can be improved.

[2] A power cable according to another aspect of the present disclosure includes:

a conductor, and an insulating layer coated on an outer circumference of the conductor, wherein the insulating layer is formed from a resin composition, the resin composition includes a resin component containing propylene units, and a resistance-imparting agent, the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

According to this configuration, the insulation of the power cable can be improved.

[3] In the power cable according to [2], the resin component contains at least one of ethylene units and styrene units.

According to this configuration, excessive crystal growth of the propylene-based resin can be reduced, and a high insulation and the desired flexibility can be obtained, in the insulating layer.

[4] In the power cable according to [2] or [3], the resistance-imparting agent has a linear carbon structure having 5 or more and 10 or less carbon atoms.

According to this configuration, electrical stability can be imparted to the insulating layer.

[5] In the power cable according to any one of [2] to [4], the resistance-imparting agent contains a sulfur atom.

According to this configuration, electrical stability can be imparted to the insulating layer.

[6] In the power cable according to any one of [2] to [5], the resistance-imparting agent has a melting point such that it becomes liquid at 27° C.

According to this configuration, the surface of the metal impurities can be more reliably coated with the resistance-imparting agent, and degradation of the insulation due to the metal impurities can be further reduced.

[7] In the power cable according to any one of [2] to [6], the resistance-imparting agent is a phenolic antioxidant.

According to this configuration, an effect of the antioxidant can be imparted to the insulating layer.

[8] In the power cable according to any one of [2] to [7], the resin composition includes as the propylene-based resin a propylene homopolymer having a melting point of 160° C. or more and 175° C. or less and an enthalpy of fusion of 100 J/g or more and 120 J/g or less, and the resin composition has a melting point of 158° C. or more and 168° C. or less and an enthalpy of fusion of 55 J/g or more and 110 J/g or less.

According to this configuration, excessive crystal growth of the propylene-based resin can be reduced, and a higher insulation can be obtained, in the insulating layer.

[9] In the power cable according to any one of [2] to [7], the resin composition includes as the propylene-based resin a propylene random copolymer having a melting point of 140° C. or more and 155° C. or less and an enthalpy of fusion of 90 J/g or more and 105 J/g or less, and the resin composition has a melting point of 140° C. or more and 150° C. or less and an enthalpy of fusion of 55 J/g or more and 100 J/g or less.

According to this configuration, excessive crystal growth of the propylene-based resin can be reduced, and a higher insulation can be obtained, in the insulating layer.

Details of Embodiment of Disclosure

Next, an embodiment of the present disclosure will be described below with reference to the drawings. The present disclosure is not limited to these illustrations, but intended to be indicated by claims and encompass all the changes which fall within the meaning and scope equivalent to claims.

One Embodiment of Disclosure (1) Resin Composition

The resin composition of this embodiment is a material included in an insulating layer 130 of a power cable 10 described later, and includes, for example, a resin component containing propylene units, a resistance-imparting agent, and other additives as needed. In addition, the resin composition contains metal impurities that are unavoidably introduced during the production process.

The metal impurities are metal powders that are introduced, for example, during a polymerization step of materials and a mixing/extrusion step of materials, and contain copper, iron, an alloy thereof, or other metal used on a production site. The size of the metal powder is not particularly limited, but is, for example, 50 μm or more and 500 μm or less. A content, that is, an introduced amount of the metal impurities is, 0.02% by volume or less. The content of the metal impurities can be obtained, for example, by taking a 100 mm$^3$ sample piece from the resin composition, calculating the volume of the metal impurities contained in the sample piece, assuming the metal impurities are spherical, and determining a volume ratio.

The resin composition of this embodiment includes at least the propylene-based resin as the resin component. Accordingly, when the resin composition is analyzed using a Nuclear Magnetic Resonance (NMR) system, at least propylene units are detected. For example, when the propylene-based resin is random polypropylene, propylene units and ethylene units are detected, and when the propylene-based resin is a propylene homopolymer, propylene units are detected.

The resin component preferably contains at least one of the low-crystallinity resin and the styrene-based resin as a flexible component that reduces crystallinity of the propylene-based resin to enhance the flexibility of the insulating layer. When the resin component contains the low-crystallinity resin and the styrene-based resin, the monomer units derived from these resins are detected by NMR analysis of the resin composition. For example, when an ethylene-propylene rubber (EPR) described below is contained as the low-crystallinity resin, propylene units and ethylene units derived from the EPR are detected. For example, when a styrene-based resin is contained, styrene units derived from the styrene-based resin are detected.

Next, individual components will be explained.
(Propylene-Based Resin)
The propylene-based resin is a base polymer of the resin composition, and is a component whose content is the highest in the resin component. As the propylene-based resin, for example, a propylene homopolymer (hereinafter also referred to as homo PP) or a propylene random copolymer (hereinafter also referred to as random PP) may be used. From a viewpoint of obtaining a higher insulation in the insulating layer, the random PP is preferably used. Compared to the random PP, the homo PP has a high amount of crystals and obtains a high insulation, but may fail to obtain inherent insulation because of causing intra- and inter-crystalline cracks in the insulating layer. In contrast, although the random PP has a small amount of crystals because of containing the ethylene units, cracks due to coarsened crystals are less likely to occur in the insulating layer, and can provide a higher insulation compared to the homo PP.

Moreover, tacticity of the propylene-based resin is not particularly limited, but is preferably isotactic. Since an isotactic propylene-based resin can reduce crystallinity when mixed with the low-crystallinity resin compared to a syndiotactic or atactic one, thereby improving brittleness of the insulating layer at low temperature, and enhancing the insulation.

The melting point and the enthalpy of fusion of the propylene-based resin are not particularly limited. For example, for the homo PP, the melting point is preferably 160° C. or more and 175° C. or less, and the enthalpy of fusion is preferably 100 J/g or more and 120 J/g or less. For example, for the random PP, the melting point is preferably 140° C. or more and 155° C. or less, and the enthalpy of fusion is preferably 90 J/g or more and 105 J/g or less.
(Low-Crystallinity Resin)
The low-crystallinity resin is a component that controls crystal growth (amount of crystals) of the propylene-based resin to impart flexibility to the insulating layer. Here, the low-crystalline resin means a component that is low crystalline or amorphous, and has no melting point or, if any, a melting point of 100° C. or less. The enthalpy of fusion of the low-crystallinity resin is, for example, 50 J/g or less, and preferably 30 J/g or less.

The low-crystallinity resin is preferably a copolymer obtained by copolymerization of at least any two of ethylene, propylene, butene, hexene, and octene, from a viewpoint of enhancing controllability of the crystal growth and flexibility of the insulating layer. A carbon-carbon double bond in a monomer unit included in the low-crystallinity resin is preferably at an α-position, for example.

Examples of the low-crystallinity resin include Ethylene Propylene Rubber (EPR) and Very Low Density Poly Ethylene (VLDPE). The very low density polyethylene is a polyethylene having a density of 0.91 g/cm$^3$ or less, preferably from 0.855 g/cm$^3$ to 0.890 g/cm$^3$.

The low-crystallinity resin is preferably a copolymer containing propylene, for example, from a viewpoint of compatibility with the propylene-based resin. As an exemplary copolymer containing propylene, EPR is mentioned among those described above.

An ethylene content in EPR is, for example, 20 mass % or more, preferably 40 mass % or more, and more preferably 55 mass % or more. When the ethylene content is less than 20 mass %, the compatibility of EPR with the propylene-based resin becomes excessively high. Therefore, even when the content of EPR in the insulating layer is reduced, the insulating layer can be made more flexible. However, the crystallization of the propylene-based resin cannot be sufficiently controlled, and the insulation may be degraded. In contrast, by setting the ethylene content to 20 mass % or more, the compatibility of EPR with the propylene-based resin can be prevented from becoming excessively high. Accordingly, the crystallization of the propylene-based resin by EPR can be sufficiently controlled while obtaining flexi- bilizing effect by EPR. As a result, the degradation of the insulation can be reduced. Further, by setting the ethylene content preferably to 40 mass % or more, and more prefer- ably to 55 mass % or more, the crystallization can be more stably controlled, thereby to stably reduce degradation of the insulation. Note that the ethylene content refers to a mass ratio of the ethylene units to the ethylene units and the propylene units included in EPR.

On the other hand, the low-crystallinity resin may be, for example, a propylene-free copolymer. As the propylene-free copolymer, for example, VLDPE is preferred from a view- point of easy availability. Examples of VLDPE include PE including ethylene and 1-butene, and PE including ethylene and 1-octene.

The propylene-free copolymer as the low-crystallinity resin can reduce complete compatibility while a predeter- mined amount of the low-crystalline resin is mixed in the propylene-based resin. Therefore, by setting the content of the copolymer to a predetermined amount or more, the crystallization of the propylene-based resin can be stably controlled.

(Styrene-Based Resin)

The styrene-based resin is a styrene-based thermoplastic elastomer containing styrene as a hard segment, and at least one of ethylene, propylene, butylene, isoprene, and the like as a soft segment. The styrene-based resin, similar to the low-crystallinity resin, can be dispersed in the resin com- position to control the crystal growth of the propylene-based resin. Specifically, when the styrene-based resin, together with the low-crystalline resin, is mixed in the propylene- based resin, the styrene-based resin is considered to be finely dispersed in the propylene-based resin, originating from the low-crystallinity resin, thereby forming a specific phase structure. Such a phase structure can reduce excessive crystal growth of the propylene-based resin. In addition, since the styrene-based resin can trap electrons with aro- matic rings to form a stable resonance structure, it can further improve the insulation of the insulating layer. Note that the styrene-based resin neither has a melting point nor an enthalpy of fusion.

Examples of the styrene-based resin include styrene- butadiene-styrene block copolymers (SBS), hydrogenated styrene-butadiene-styrene block copolymers, styrene-iso- prene-styrene copolymers (SIS), hydrogenated styrene-iso- prene-styrene copolymers, hydrogenated styrene-butadiene rubbers, hydrogenated styrene-isoprene rubbers, and sty- rene-ethylene-butylene-olefin crystal block copolymers. Two or more of them may be used in combination.

The term "hydrogenated" as used herein means hydrogen being added to a double bond. For example, "hydrogenated styrene-butadiene-styrene block copolymer" means a poly- mer obtained by adding hydrogen to double bonds of the styrene-butadiene-styrene block copolymer. Note that double bonds in the aromatic ring included in styrene has no hydrogen added thereto. The term "hydrogenated styrene- butadiene-styrene block copolymer" can also be referred to as styrene-ethylene butylene-styrene block copolymer (SEBS).

As the styrene-based resin, those having no double bonds in their chemical structures excluding benzene rings are preferred. The use of those having double bonds may result in thermally degraded resin component, for example, during molding of the resin composition, which may degrade the properties of the resulting molded body. In this regard, since those having no double bond has high resistance to thermal degradation, they can be used to maintain the properties of the molded body at a higher level.

The styrene content of the styrene-based resin is not particularly limited, but preferably 5 mass % or more and 35 mass % or less from viewpoints of controlling the crystal growth of the propylene-based resin and flexibilizing the molded body. Note that the styrene content indicates a mass ratio of the styrene units to the component units included in the styrene-based resin.

(Resistance-Imparting Agent)

The resistance-imparting agent is a component that coats the metal impurities present in the insulating layer and mitigates the sharp change in resistance at the interface between the metal impurities and the insulating layer. Spe- cifically, the resistance-imparting agent is a monomer that has a phenol skeleton, including hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less. Preferably, the resistance- imparting agent is a phenolic antioxidant having the above- described melting point, molecular weight, and chemical structure.

The mechanism by which the resistance-imparting agent coats the metal impurities and mitigates the change in resistance at the interface is presumed as follows.

Generally, the resin components including the resistance- imparting agent and the propylene-based resin is mixed, for example, while heating at 200° C. to 220° C. because the melting point of the propylene-based resin is about 140° C. to 160° C. Therefore, the resistance-imparting agent that has the melting point of 215° C. or less tends to melt to become liquid at the time of heat-mixing. Since the resistance- imparting agent has a polarity due to its phenol skeleton, and hence high affinity for the metal impurities, it is assumed that it collect around the metal impurities introduced in the resin component at the time of heat-mixing with the resin com- ponent to thereby coat the metal impurities.

Moreover, the resistance-imparting agent has hydrogen or an alkyl group having 1 to 3 carbon atoms at at least one of the ortho positions to the hydroxyl group included in its phenol skeleton, and no bulky substituent located at at least either of the ortho positions to the hydroxyl group. That is, the resistance-imparting agent has small steric hindrance around the hydroxyl group. Therefore, the reactivity of the hydroxyl group in the resistance-imparting agent tends to be high. In contrast, for example, in a monomer having bulky substituents (e.g., t-butyl groups) located at two ortho posi- tions to the hydroxyl group (so-called hindered phenolic antioxidant), steric hindrance is greater. In such monomers, the reactivity of the hydroxyl groups is inhibited by steric hindrance, and the affinity for the metal impurities is reduced. In this regard, the resistance-imparting agent of this embodiment has small steric hindrance and the hydroxyl group with high reactivity, and thus can more reliably coat the metal impurities compared to the component having greater steric hindrance such as a hindered phenol antioxi- dant, for example.

Moreover, by setting the molecular weight of the resis- tance-imparting agent to 200 or more, volatilization of the resistance-imparting agent can be reduced when the resin composition is heat-mixed. Furthermore, by setting the molecular weight to 500 or less, the resistance-imparting agent can be suitably moved in the resin component. As a result, the aggregation of the resistance-imparting agent in the resin composition can be reduced, thereby uniformly dispersing the resistance-imparting agent, and the surface of the metal impurities present in the resin composition can be coated with the resistance-imparting agent.

In addition, since the resistance-imparting agent has polarity due to its phenol skeleton, it can mitigate the sharp change in resistance at the interface between the metal impurities and the insulating layer. In addition, since the resistance-imparting agent has polarity due to its phenol skeleton, it can mitigate the sharp change to provide a gradual change in resistance at the interface between the metal impurities and the insulating layer.

As described above, the resistance-imparting agent can coat the metal impurities in the insulating layer and mitigate the sharp change in resistance at the interface between the metal impurities and the insulating layer and concentration of electric field to the metal impurities.

A molecular weight of the resistance-imparting agent is 200 or more and 500 or less. From the viewpoints of reducing volatilization of the resistance-imparting agent and reducing aggregation of the resistance-imparting agent to disperse in the resin composition, the molecular weight of the resistance-imparting agent is preferably 300 or more and 450 or less.

The melting point of the resistance-imparting agent is not particularly limited so long as it is 215° C. or less, but is preferably 130° C. or less. Since the melting point is 130° C. or less, the metal impurities can be more reliably coated with the resistance-imparting agent at the time of heat-mixing of the resin composition. Further, the melting point may be such that the resistance-imparting agent becomes liquid at an ordinary temperature (27° C.). Specifically, it is more preferably 27° C. or less. Since the melting point is 27° C. or less, the resistance-imparting agent can flow in the insulating layer, and be retained around the metal impurities. As a result, the resistance-imparting agent can more reliably coat the surface of the metal impurities, and therefore the degradation of the insulation due to the metal impurities can be further reduced. The lower limit is not particularly limited, but is preferably –30° C. or more.

For the resistance-imparting agent, the number of the phenol skeletons is not particularly limited so long as the molecular weight of the resistance-imparting agent falls within a range of 200 or more and 500 or less, and is 1 or 2, for example.

From the viewpoint of enhancing compatibility with the resin component, the resistance-imparting agent preferably has a linear carbon structure having 5 or more and 10 or less carbon atoms in the phenol skeleton. By enhancing the compatibility of the resistance-imparting agent, the resistance-imparting agent can be uniformly present in the resin composition, so that the metal impurities can be more reliably coated. The number of the linear carbon structures is not particularly limited so long as the molecular weight of the resistance-imparting agent falls within the above-described range, but is 1 or 2, for example. From the viewpoint of enhancing the compatibility while satisfying the molecular weight range, the number of the linear carbon structures is preferably 2. Further, the linear carbon structure may be at the other ortho position to the hydroxyl group. It is because hydrogen or an alkyl group having 1 to 3 carbon atoms present at at least one of the ortho positions to the hydroxyl group can reduce degradation of reactivity due to steric hindrance. Furthermore, the linear carbon structure may be bonded to the aromatic ring directly or through another atom such as a sulfur atom or a nitrogen atom.

The resistance-imparting agent is a monomer containing carbon, hydrogen, and oxygen atoms. In addition to the atoms described above, it may contain sulfur or nitrogen atoms. Preferably, it contains a sulfur atom.

There is no limitation on the resistance-imparting agent so long as it satisfies the chemical structure, molecular weight, and melting point described above. For example, 2-(2H-benzotriazol-2-yl)-4-(1,1,3,3-tetramethylbutyl)phenol, 2-hydroxy-4-n-octyloxybenzophenone, 2,4-dihydroxyben-zophenone, 2,2'-dihydroxy-4,4'-dimethoxybenzophenone, 2,4-bis(octylthiomethyl)-6-methylphenol, nonylphenol, or dinonylphenol can be used. Among them, 2,4-bis(octylthio-methyl)-6-methylphenol is preferred because it has a linear carbon structure having a sulfur atom and 5 or more and 10 or less carbon atoms, and has high compatibility with the resin component.

The content of the resistance-imparting agent is 0.4 parts by mass or more and 10 parts by mass or less with respect to 100 parts by mass of the resin component. Preferably, it is 0.5 parts by mass or more and 8 parts by mass or less. Since the resistance-imparting agent can easily coat the metal impurities by setting its content to 0.4 parts by mass or more, it can mitigate degradation of the insulation due to the voids. Further, excessively greater addition amount of the resistance-imparting agent makes it difficult to mold the resin composition into the insulating layer. However, setting the addition amount to 10 parts by mass or less can secure moldability of the resin composition.

(Other Additives)

The resin composition may include other additives as needed. As the other additives, antioxidants excluding the resistance-imparting agents described above, copper inhibitors, lubricants, and colorants may be included.

However, in the resin composition, for example, the content of the additive that serves as a nucleating agent for generating propylene crystals is preferably small. More preferably, the resin composition is substantially free from such an additive. Specifically, the content of the additive that serves as a nucleating agent is, for example, preferably less than 1 part by mass, and more preferably 0 parts by mass, with respect to the total content of the resin components being 100 parts by mass. Accordingly, the occurrence of unexpected abnormal crystallization due to the nucleating agent can be reduced, and the amount of crystals can be easily controlled.

In addition, from the viewpoint of recycling, the resin composition is preferably non-cross-linked, without cross-linking, but may include the cross-linking agent for cross-linking. When cross-linked, it is preferable to perform cross-linking so as to reduce the gel fraction (degree of cross-linking). Specifically, it is preferable to perform cross-linking with the degree of cross-linking such that the mass ratio of the residue of the cross-linking agent in the resin composition is less than 300 ppm. When dicumyl peroxide is used as the cross-linking agent, the residue includes, for example, cumyl alcohol and α-methylstyrene.

(Melting Point and Enthalpy of Fusion of Resin Composition)

The melting point and the enthalpy of fusion of the resin composition vary depending on the content of the individual propylene-based resin or the low-crystallinity resin used as the resin component, and are considered as indicators of the resin composition. The melting point and the enthalpy of fusion of the resin composition are not particularly limited, but it is preferred that when the random PP is included as the propylene-based resin, the melting point is 140° C. or more and 150° C. or less, and the enthalpy of fusion is 55 J/g or more and 100 J/g or less. More preferably, the melting point is 140° C. or more and 148° C. or less, and the enthalpy of fusion is 55 J/g or more and 95 J/g or less. On the other hand, it is preferred that when the homo PP is included as the propylene-based resin, the melting point is 158° C. or more and 168° C. or less, and the enthalpy of fusion is 55 J/g or more and 110 J/g or less. More preferably, the melting point is 158° C. or more and 165° C. or less, and the enthalpy of fusion is 55 J/g or more and 100 J/g or less. By blending the propylene-based resin and at least one of the low-crystallinity resin and the styrene-based resin so as to have the melting point and enthalpy of fusion described above, excessive crystal growth of the propylene-based resin can be reduced, and the properties due to the resins can be obtained.

The "melting point" and "enthalpy of fusion" used herein are measured by differential scanning calorimetry (DSC). The "differential scanning calorimetry" is performed, for example, according to JIS-K-7121 (1987). Specifically, in the DSC apparatus, the temperature of a measurement sample is raised from room temperature (ordinary temperature, for example, 27° C.) to 220° C. at a rate of 10° C./min. Accordingly, by plotting endothermic amount per unit time (heat flow) against temperature, a DSC curve can be obtained.

In this case, the temperature at which an endothermic amount per unit time in the sample is maximum (highest peak) is defined as "melting point (melting peak temperature)". In this case, assuming that all the endotherm of the sample is performed by the resin component, the value (J/g) obtained by dividing the endothermic amount (J) of the sample from room temperature to 220° C. by the total mass (g) of the resin component in the sample is defined as "enthalpy of fusion". The crystallinity (%) of the sample can be obtained based on the enthalpy of fusion of the sample and the theoretical enthalpy of fusion of the perfect crystal.

(Resin Composition)

It is preferred that the content of each component included in the resin composition is adequately modified so that the melting point and the enthalpy of fusion of the resin composition fall within the above-described range. For example, the resin composition preferably includes 55 parts by mass or more and 95 parts by mass or less of the propylene-based resin and 5 parts by mass or more and 45 parts by mass or less of the flexible component, with respect to a total of the propylene-based resin and the flexible component containing at least one of the low-crystallinity resin and the styrene-based resin being 100 parts by mass. More preferably, it includes 60 parts by mass or more and 95 parts by mass or less of the propylene-based resin, and 5 parts by mass or more and 40 parts by mass or less of the flexible component. With such addition amounts, the amount of crystals can be adjusted within an appropriate range in the resin composition. As a result, when the insulating layer is formed using the resin composition, formation of the voids in the insulating layer can be reduced. The addition ratio of the low-crystallinity resin and the styrene-based resin is not particularly limited so long as the addition amount totaling them falls within the above-described range.

(2) Power Cable

Next, with reference to FIG. 1, the power cable of this embodiment will be described. FIG. 1 is a cross-sectional view orthogonal to an axial direction of the power cable according to this embodiment.

The power cable 10 of this embodiment is configured as a so-called solid insulation power cable. In addition, the power cable 10 of this embodiment is configured, for example, to be laid on the ground (in a pipeline), under water, or on the bottom of water. The power cable 10 is used, for example, for AC.

Specifically, the power cable 10 includes, for example, a conductor 110, an internal semiconductive layer 120, an insulating layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided so as to cover the outer circumference of the conductor 110. In addition, the internal semiconductive layer 120 has semiconductivity and is configured to reduce concentration of electric field on the surface side of the conductor 110. The internal semiconductive layer 120 includes, for example, at least any one of ethylene-based copolymers such as ethylene-ethyl acrylate copolymers, ethylene-methyl acrylate copolymers, ethylene-butyl acrylate copolymers, and ethylene-vinyl acetate copolymers, olefinic elastomers, the above-described low-crystallinity resins and the like, together with conductive carbon black.

(Insulating Layer)

The insulating layer 130 is provided so as to cover the outer circumference of the internal semiconductive layer 120, and configured as the above-described resin composition molded body. The insulating layer 130 is extruded, for example, from the resin composition, as described above.

(External Semiconductive Layer)

The external semiconductive layer 140 is provided to cover the outer circumference of the insulating layer 130. In addition, the external semiconductive layer 140 has semiconductivity, and is configured to reduce concentration of electric field between the insulating layer 130 and the shielding layer 150. The external semiconductive layer 140 includes, for example, the same material as that of the internal semiconductive layer 120.

(Shielding Layer)

The shielding layer 150 is provided so as to cover the outer circumference of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided so as to cover the outer circumference of the shielding layer 150. The sheath 160 includes, for example, polyvinyl chloride or polyethylene.

For an underwater cable or a subaqueous cable, the power cable 10 of this embodiment may have a metallic water shielding layer such as a so-called alclad or an iron wire armoring outside the shielding layer 150.

On the other hand, the power cable 10 of this embodiment does not have to include a water shielding layer outside the shielding layer 150. That is, the power cable 10 of this embodiment may include an imperfect water shielding structure.

(Specific Dimensions and the Like)

Specific dimensions of the power cable 10 are not particularly limited. For example, the diameter of the conductor 110 is 5 mm or more and 60 mm or less, the thickness of the internal semiconductive layer 120 is 0.5 mm or more and 3 mm or less, the thickness of the insulating layer 130 is 3 mm or more and 35 mm or less, the thickness of the external semiconductive layer 140 is mm or more and 3 mm or less, the thickness of the shielding layer 150 is 0.1 mm or more and 5 mm or less, and the thickness of the sheath 160 is 1 mm or more. The AC voltage applied to the power cable 10 of this embodiment is, for example, 20 kV or more.

(3) Cable Properties

In this embodiment, since the insulating layer 130 (resin composition molded body) is configured to include the above-described resistance-imparting agent, the insulation described below can be obtained.

The insulating layer 130 of this embodiment exhibits a high insulation at a content ratio of the metal impurities within a range of 0.02% by volume or less. Specifically, a sample of a 0.4 mm-thick sheet formed from the resin composition described above in which copper pieces with a diameter of 200 μm or less are embedded as metal impurities is subjected to a commercial frequency (e.g., 60 Hz) AC voltage under conditions of applying a voltage of 10 kV for 10 minutes, then repeating cycle of raising the voltage by 1 kV increment and applying the raised voltage for 10 minutes. In this event, the AC breakdown electric field strength is 45 kV/mm or more. That is, with the content ratio of the metal impurities within a range of 0.02% by volume or less, the desired AC breakdown field strength can be obtained in the insulating layer, and a high insulation can be secured.

(4) Method of Producing Power Cable

Next, a method of producing the power cable of this embodiment will be described. Hereinafter, the step is abbreviated as "S".

(S100: Resin Composition Preparation Step)

First, the resin composition for forming the insulating layer 130 is prepared.

In this embodiment, as the resin components, a propylene-based resin, a flexible component containing at least one of a low-crystallinity resin and a styrene-based resin, a resistance-imparting agent, and other additives as needed are mixed (kneaded) in a mixer to form an admixture. During kneading, the molten resistance-imparting agent collects around the metal impurities included in the resin component, thereby coating the metal impurities. Examples of the mixer include an open roll, a Banbury mixer, a pressure kneader, a single-screw mixer, and a multi-screw mixer.

In this case, as for the addition amount of individual resins, for example, that for the propylene-based resin may be 55 parts by mass or more and 95 parts by mass or less, and that for the flexible component may be 5 parts by mass or more and 45 parts by mass or less, with respect to a total content of the propylene-based resin and the flexible component containing at least one of a low-crystallinity resin and a styrene-based resin being 100 parts by mass. The content of the resistance-imparting agent is 0.4 parts by mass or more and 10 parts by mass or less with respect to a total content of the propylene-based resin and the low-crystallinity resin being 100 parts by mass.

After the admixture is formed, the admixture is granulated by an extruder. As a result, a pellet-like resin composition that is to be included in the insulating layer 130 is formed. The steps from the mixing step through the granulation step may be collectively performed using a twin-screw type extruder with high kneading performance.

In this embodiment, when the resin component and the resistance-imparting agent are heat-mixed, the resistance-imparting agent can be melted to coat the surface of the metal impurities introduced in the resin component. In the resin composition, the resistance-imparting agent is dispersed in the resin component and interposed at the interface between the metal impurities and the resin component.

(S200: Conductor Preparation Step)

On the other hand, a conductor 110 is prepared which is formed by twisting a plurality of conductor core wires.

(S300: Cable Core Formation Step (Extrusion Step, Insulating Layer Formation Step))

After the resin composition preparation step S100 and the conductor preparation step S200 are completed, the above-described resin composition is used to form the insulating layer 130 with a thickness of 3 mm or more which covers the outer circumference of the conductor 110.

In this event, the internal semiconductive layer 120, the insulating layer 130, and the external semiconductive layer 140 are formed simultaneously, for example, using a three-layer coextruder.

Specifically, for example, a resin composition for the internal semiconductive layer is charged into an extruder A of the three-layer coextruder, the extruder A forming the internal semiconductive layer 120.

The pellet-like resin composition described above is charged into an extruder B forming the insulating layer 130. The set temperature of the extruder B is set to a temperature higher than the desired melting point by 10° C. or more and 50° C. or less. It is preferable to appropriately adjust the set temperature based on a linear velocity and an extrusion pressure.

A composition for the external semiconductive layer is charged into an extruder C forming the external semiconductive layer 140, the composition including materials similar to those of the resin composition for the internal semiconductive layer charged into the extruder A.

Then, the respective extrudates from the extruders A to C are guided to a common head, and the internal semiconductive layer 120, the insulating layer 130, and the external semiconductive layer 140, outwardly from the inside, are simultaneously extruded on the outer circumference of the conductor 110. Accordingly, an extruded material that is to be a cable core is formed.

The extruded material is then cooled, for example, with water.

The cable core including the conductor 110, the internal semiconductive layer 120, the insulating layer 130, and the external semiconductive layer 140 is formed by the cable core formation step S300 described above.

(S400: Shielding Layer Formation Step)

After the cable core is formed, the shielding layer 150 is formed outside the external semiconductive layer 140, for example, by winding a copper tape therearound.

(S500: Sheath Formation Step)

After the shielding layer 150 is formed, vinyl chloride is charged into an extruder, and extruded from the extruder to form a sheath 160 on the outer circumference of the shielding layer 150.

As described above, the power cable 10 as the solid insulation power cable is produced.

(4) Effect According to this Embodiment

According to this embodiment, one or more effects described below are achieved.

(a) The insulating layer of this embodiment is formed from the resin composition that includes the resin component containing the propylene-based resin and at least one of the low-crystallinity resin and the styrene-based resin, and the resistance-imparting agent having a predetermined molecular weight, melting point, and chemical structure so that the content of the resistance-imparting agent is 0.4 parts by mass to 10 parts by mass with respect to 100 parts by mass of the resin component. The low-crystallinity resin and the styrene-based resin can reduce excessive crystal growth of the propylene-based resin, and improve the insulation of the insulating layer. The resistance-imparting agent having the predetermined melting point and chemical structure can be melted during heat-mixing with the resin component to coat the surface of the metal impurities introduced in the resin component. That is, the resistance-imparting agent can be interposed at the interface between the metal impurities and the resin component. Since the resistance-imparting agent has aromatic rings and polarity derived from its phenol skeleton, it can mitigate the sharp change in resistance between the resin component and the metal impurities and also mitigate the concentration of electric field to the metal impurities, thereby reducing degradation of the insulation due to the metal impurities. Thus, the insulating layer of this embodiment can obtain a high insulation while reducing degradation of the insulation due to the metal impurities by coating the metal impurities with the resistance-imparting agent, provided that the content ratio of the metal impurities falls within a range of 0.02% by volume or less.

(b) The melting point of the resistance-imparting agent is preferably 130° C. or less, and more preferably a melting point such that the resistance-imparting agent becomes liquid at 27° C. The resistance-imparting agent having such a melting point can more reliably coat the surface of the metal impurities during heat-mixing of the resin composition, and improve the insulation of the insulating layer.

(c) The resistance-imparting agent preferably has a linear carbon structure having 5 or more and 10 or less carbon atoms. The resistance-imparting agent preferably contains a sulfur atom. Such a resistance-imparting agent is excellent in compatibility with the resin component, and therefore can easily coat the metal impurities during the heat-mixing of the resin composition and also impart electrical stability to the insulating layer.

(d) The resin composition preferably includes the random PP as the propylene-based resin. The random PP can reduce cracks in the insulating layer and obtain a higher insulation, compared to the homo PP.

(e) The resin composition preferably includes the random PP and the styrene-based resin, or the random PP, the low-crystallinity resin, and the styrene-based resin. The use of at least the random PP and the styrene-based resin can facilitate reduction of the growth of coarse crystals of the propylene-based resin to obtain a high insulation in the insulating layer.

(f) The resin composition preferably includes the random PP as the propylene-based resin and the flexible component that is the low-crystallinity resin or the styrene-based resin at a ratio such that the melting point of the resin composition is 140° C. or more and 150° C. or less, and the enthalpy of fusion is 55 J/g or more and 100 J/g or less. In addition, the resin composition preferably includes the homo PP as the propylene-based resin and the flexible component that is the low-crystallinity resin or the styrene-based resin at a ratio such that the melting point of the resin composition is 158° C. or more and 168° C. or less, and the enthalpy of fusion is 55 J/g or more and 110 J/g or less. When the individual components are included at a ratio such that the enthalpy of fusion and the melting point of the resin composition fall within the above-described range, excessive crystal growth of the propylene-based resin can be reduced in the insulating layer, and a higher insulation can be obtained in the insulating layer.

(g) The resin composition preferably includes, as the resin components, the propylene-based resin, the low-crystallinity resin, and the styrene-based resin. Accordingly, compared to a case where only the low-crystallinity resin or the styrene-based resin is added, crystal growth of the propylene-based resin can be further controlled, and a higher insulation can be obtained in the insulating layer.

Other Embodiments of Disclosure

Although embodiments of the present disclosure have been specifically described, the present disclosure is not limited to the embodiments described above, and various modifications can be made without departing from the gist of the present disclosure.

In the above-described embodiments, an explanation is given for the resin composition molded body as the insulating layer obtained by mechanical mixing and extrusion, but the resin composition molded body may be the one obtained by polymerization and extrusion.

In the above-described embodiments, an explanation is given for a case where the power cable 10 may have no water shielding layer, but the present disclosure is not limited to the case. Since the power cable 10 has the remarkable water-treeing reduction effect described above, it may have a simple water shielding layer. Specifically, the simple water shielding layer includes, for example, a metallic laminated tape. The metallic laminated tape has, for example, a metal layer containing aluminum, copper, or the like, and an adhesive layer provided on one or both surfaces of the metal layer. The metallic laminated tape is wrapped longitudinally around the outer circumference of a cable core (outer circumference outward of the external semiconductive layer) so as to surround of the cable core. The water shielding layer may be provided outside the shielding layer, and may also serve as the shielding layer. This configuration can reduce the cost of the power cable 10.

In the above-described embodiments, an explanation is given for a case where the power cable 10 is configured to be laid on the ground, under water, or on the bottom of water, but the present disclosure is not limited to the case. For example, the power cable 10 may be configured as a so-called overhead wire (overhead insulated wire).

In the above-described embodiments, three layers are extruded simultaneously in the cable core formation step S300, but they may be individually extruded.

EXAMPLES

Next, examples according to the present disclosure will be described. These examples are illustrative of the present disclosure, and the present disclosure is not limited by these examples.

(1) Preparation of Evaluation Samples

In this example, evaluation samples which mimic the insulating layer of the power cable were prepared according to the following procedures. In this example, in order to evaluate the change in the insulation due to a metal impurity introduced therein, metal powders were added to the resin composition as the metal impurities to prepare an evaluation sample.

(1-1) Materials

As materials of the resin composition for forming evaluation samples, the following components were prepared.

As the propylene-based resin (A), the followings were used:

Isotactic propylene homopolymer (homo PP): melt flow rate: 0.5 g/10 min, density: 0.9 g/ml, melting point: 165° C., enthalpy of fusion: 115 J/g Random polypropylene (random PP): melt flow rate:1.3 g/10 min, density: 0.9 g/ml, melting point: 145° C., enthalpy of fusion: 100 J/g As the low-crystallinity resin (B), the following was used:

Ethylene-propylene rubber (EPR): ethylene content: 52 mass %, Mooney viscosity ML (1+4) 100° C.: 40, melting point: absent, enthalpy of fusion: absent.

As the styrene-based resin (C), the following was used:

Hydrogenated styrene-based thermoplastic elastomer (SEBS): styrene content: 12 mass %, hardness: A42, melt flow rate: 4.5 g/10 min (230° C., 2.16 kg), melting point: absent, enthalpy of fusion: absent.

As components (D), and control components (D') that are in comparative forms of the resistance-imparting agents (D), the followings were used.

Copper material is shaved with a metal file, and the obtained copper powder is separated by a sieve with an opening of 200 μm and used as the metal powder.

TABLE 1

| | | Type | Molecular weight | Phenol number | Surrounding of hydroxyl group | Melting point |
|---|---|---|---|---|---|---|
| Resistance- imparting agent (D) | (d1) | 2-(2H-Benzotriazol-2-yl)-4-(1,1,3,3-tetramethylbutyl)phenol | 323 | 1 | — | 102° C. |
| | (d2) | 2-Hydroxy-4-n-octyloxybenzophenone | 326 | 1 | — | 45° C. |
| | (d3) | 2,4-Dihydroxybenzophenone | 214 | 2 | — | 142° C. |
| | (d4) | 2,2'-Dihydroxy-4,4'-dimethoxybenzophenone | 274 | 2 | — | 135° C. |
| | (d5) | 2,4-Bis(octylthiomethyl)-6-methylphenol | 425 | 1 | — | 14° C. |
| | (d6) | Nonylphenol | 220 | 1 | — | bp 293° C. |
| | (d7) | Dinonylphenol | 346 | 1 | — | −20° C. |
| | (d8) | 6,6'-Di-tert-butyl-4,4'-butyliden-m-cresol | 383 | 2 | One-hindered | 210° C. |
| Comparative component (D') | (d'1) | 2-(4,6-Dimethyl-1,3,5-triazin-2-yl)-5-[2-(2-ethylhexanoyloxy)ethoxy]phenol | 512 | 1 | — | 106° C. |
| | (d'2) | 2-[4,8-Di(2,4-xylyl)-1,3,5-triazin-2-yl]-5-octyloxyphenol | 509 | 1 | — | 90° C. |
| | (d'3) | Glycerin monostearate | 358 | — | — | 63° C. |
| | (d'4) | Dibenzyl ether | 198 | — | — | 4° C. |
| | (d'5) | Octyl-3,5-di-tert-butyl-4-hydroxy-hydrocinnamic acid | 390 | 1 | Hindered | 10° C. |
| | (d'6) | Benzyl alcohol | 108 | — | — | −15° C. |
| | (d'7) | 1,3,5-Tris(3,5-di-tert-butyl-4-hydroxybenzyl)-1,3,5-triazin-2,4,6(1H,3H,5H)-trione | 784 | 3 | Hindered | 220° C. |
| | (d'8) | 4,4',4''-(1-Methylpropanyl-3-ylidene)tris(6-tert-butyl-m-cresol) | 545 | 3 | One-hindered | 185° C. |
| | (d'9) | Acetophenone | 120 | — | — | bp 202° C. |
| | (d'10) | Decanophenone | 232 | — | — | 35° C. |

In Table 1, the column with the header "Phenol number" indicates the number of phenol skeletons in the compound, where "-" represents 0. The column with the header "Surrounding of hydroxyl group" indicates the presence or absence of steric hindrance around the hydroxyl group, where "-" represents small steric hindrance, "One-hindered" represents a bulky substituent existing at one of the ortho positions to the hydroxyl group, and "Hindered" represents bulky substituents existing at both ortho positions. For the resistance-imparting agent (d6) and the resistance-imparting agent (d'9) that are liquid at an ordinary temperature (27° C.), their boiling points (bp) are listed.

(1-2) Preparation of Resin Composition

The above-described materials were heat-mixed at the ratio shown in the following Tables 2 to 7 to prepare the resin composition.

TABLE 2

| | | Molecular weight | Phenol number | Surrounding of hydroxyl group | Melting point | Sample | | | | | |
|---|---|---|---|---|---|---|---|---|---|---|---|
| | | | | | | 1 | 2 | 3 | 4 | 5 | 6 |
| Propylene-based resin (A) | Homo PP | | | — | | 75 | 75 | 75 | 75 | 75 | 75 |
| | Random PP | | | — | | — | — | — | — | — | — |
| Low-crystallinity resin (B) | EPR | | | — | | 25 | 25 | 25 | 25 | 25 | 25 |

TABLE 2-continued

| | | Molecular weight | Phenol number | Surrounding of hydroxyl group | Melting point | Sample 1 | 2 | 3 | 4 | 5 | 6 |
|---|---|---|---|---|---|---|---|---|---|---|---|
| Styrene-based resin (C) | SEBS | | | — | | — | — | — | — | — | — |
| Resistance-imparting agent (D) | (d1) | 323 | 1 | — | 102° C. | 6 | — | 0.3 | 0.5 | 9 | 12 |
| | (d2) | 326 | 1 | — | 45° C. | — | — | — | — | — | — |
| | (d3) | 214 | 2 | — | 142° C. | — | — | — | — | — | — |
| | (d4) | 274 | 2 | — | 135° C. | — | — | — | — | — | — |
| | (d5) | 425 | 1 | — | 14° C. | — | — | — | — | — | — |
| | (d6) | 220 | 1 | — | bp 293° C. | — | — | — | — | — | — |
| | (d7) | 346 | 1 | — | -20° C. | — | — | — | — | — | — |
| | (d8) | 383 | 2 | One-hindered | 210° C. | — | — | — | — | — | — |
| | Presence/absence of metal impurities | | | | | Present | Present | Present | Present | Present | Present |
| Insulating layer Evaluation | Enthalpy of fusion [J/g] | | | | | 87 | 91 | 90 | 89 | 83 | 81 |
| | Melting point [° C.] | | | | | 160 | 162 | 162 | 162 | 159 | 159 |
| | AC breakdown electric field strength [kV/mm] | | | | | 63 | 31 | 28 | 49 | 68 | — |

TABLE 3

| | | Molecular weight | Phenol number | Surrounding of hydroxyl group | Melting point | Sample 7 | 8 | 9 | 10 |
|---|---|---|---|---|---|---|---|---|---|
| Propylene-based resin (A) | Homo PP | | | — | | 75 | 75 | 75 | 75 |
| | Random PP | | | — | | — | — | — | — |
| Low-crystallinity resin (B) | EPR | | | — | | 25 | 25 | 25 | 25 |
| Styrene-based resin (C) | SEBS | | | — | | — | — | — | — |
| Resistance-imparting agent (D) | (d1) | 323 | 1 | — | 102° C. | — | — | — | — |
| | (d2) | 326 | 1 | — | 45° C. | 5 | — | — | — |
| | (d3) | 214 | 2 | — | 142° C. | — | 5 | — | — |
| | (d4) | 274 | 2 | — | 135° C. | — | — | 3 | — |
| | (d5) | 425 | 1 | — | 14° C. | — | — | — | 5 |
| | (d6) | 220 | 1 | — | bp 293° C. | — | — | — | — |
| | (d7) | 346 | 1 | — | -20° C. | — | — | — | — |
| | (d8) | 383 | 2 | One-hindered | 210° C. | — | — | — | — |
| | Presence/absence of metal impurities | | | | | Present | Present | Present | Present |
| Insulating layer Evaluation | Enthalpy of fusion [J/g] | | | | | 88 | 89 | 90 | 88 |
| | Melting point [° C.] | | | | | 161 | 161 | 162 | 162 |
| | AC breakdown electric field strength [kV/mm] | | | | | 60 | 62 | 54 | 66 |

TABLE 4

| | | Molecular weight | Phenol number | Surrounding of hydroxyl group | Melting point | Sample 11 | 12 | 13 | 14 | 15 |
|---|---|---|---|---|---|---|---|---|---|---|
| Propylene-based resin (A) | Homo PP | | | — | | 75 | 75 | 75 | 75 | 75 |
| | Random PP | | | — | | — | — | — | — | — |
| Low-crystallinity resin (B) | EPR | | | — | | 25 | 25 | 25 | 25 | 25 |
| Styrene-based resin (C) | SEBS | | | — | | — | — | — | — | — |
| Resistance-imparting agent (D) | (d1) | 323 | 1 | — | 102° C. | — | — | — | — | — |
| | (d2) | 326 | 1 | — | 45° C. | — | — | — | — | — |
| | (d3) | 214 | 2 | — | 142° C. | — | — | — | — | — |
| | (d4) | 274 | 2 | — | 135° C. | — | — | — | — | — |
| | (d5) | 425 | 1 | — | 14° C. | 0.5 | 0.3 | — | — | — |
| | (d6) | 220 | 1 | — | bp 293° C. | — | — | 5 | — | — |
| | (d7) | 346 | 1 | — | -20° C. | — | — | — | 6 | — |
| | (d8) | 383 | 2 | One-hindered | 210° C. | — | — | — | — | 6 |
| | Presence/absence of metal impurities | | | | | Present | Present | Present | Present | Present |
| Insulating layer Evaluation | Enthalpy of fusion [J/g] | | | | | 90 | 91 | 89 | 86 | 89 |
| | Melting point [° C.] | | | | | 162 | 162 | 161 | 161 | 162 |
| | AC breakdown electric field strength [kV/mm] | | | | | 48 | 24 | 57 | 60 | 56 |

TABLE 5

| | | Molecular weight | Phenol number | Surrounding of hydroxyl group | Melting point | Sample 16 | 17 | 18 | 19 | 20 | 21 |
|---|---|---|---|---|---|---|---|---|---|---|---|
| Propylene-based resin (A) | Homo PP | | | — | | — | — | — | — | — | — |
| | Random PP | | | — | | 65 | 65 | 65 | 70 | 70 | 70 |
| Low-crystallinity resin (B) | EPR | | | — | | 35 | 35 | 35 | 10 | 10 | 10 |
| Styrene-based resin (C) | SEBS | | | — | | — | — | — | 20 | 20 | 20 |
| Resistance-imparting agent (D) | (d1) | 323 | 1 | — | 102° C. | 5 | 0.5 | — | — | — | — |
| | (d2) | 326 | 1 | — | 45° C. | — | — | — | — | — | — |
| | (d3) | 214 | 2 | — | 142° C. | — | — | — | — | — | — |
| | (d4) | 274 | 2 | — | 135° C. | — | — | — | — | — | — |
| | (d5) | 425 | 1 | — | 14° C. | — | — | — | 5 | 0.5 | — |
| | (d6) | 220 | 1 | — | bp 293° C. | — | — | — | — | — | — |
| | (d7) | 346 | 1 | — | −20° C. | — | — | — | — | — | — |
| | (d8) | 383 | 2 | One-hindered | 210° C. | — | — | — | — | — | — |
| | Presence/absence of metal impurities | | | | | Present | Present | Present | Present | Present | Present |
| Insulating layer Evaluation | Enthalpy of fusion [J/g] | | | | | 61 | 67 | 68 | 69 | 73 | 75 |
| | Melting point [° C.] | | | | | 142 | 143 | 143 | 142 | 144 | 144 |
| | AC breakdown electric field strength [kV/mm] | | | | | 84 | 72 | 37 | 82 | 74 | 41 |

TABLE 6

| | | Molecular weight | Phenol number | Surrounding of hydroxyl group | Melting point | Sample 22 | 23 | 24 | 25 | 26 |
|---|---|---|---|---|---|---|---|---|---|---|
| Propylene-based resin (A) | Homo PP | | | — | | 75 | 75 | 75 | 75 | 75 |
| | Random PP | | | — | | — | — | — | — | — |
| Low-crystallinity resin (B) | EPR | | | — | | 25 | 25 | 25 | 25 | 25 |
| Styrene-based resin (C) | SEBS | | | — | | — | — | — | — | — |
| Resistance imparting agent (D') | (d'1) | 512 | 1 | — | 106° C. | 8 | — | — | — | — |
| | (d'2) | 509 | 1 | — | 90° C. | — | 5 | — | — | — |
| | (d'3) | 358 | — | — | 63° C. | — | — | 5 | — | — |
| | (d'4) | 198 | — | — | 4° C. | — | — | — | 6 | — |
| | (d'5) | 390 | 1 | Hindered | 10° C. | — | — | — | — | 6 |
| | (d'6) | 108 | — | — | −15° C. | — | — | — | — | — |
| | (d'7) | 784 | 3 | Hindered | 220° C. | — | — | — | — | — |
| | (d'8) | 545 | 3 | One-hindered | 185° C. | — | — | — | — | — |
| | (d'9) | 120 | — | — | bp 202° C. | — | — | — | — | — |
| | (d'10) | 232 | — | — | 35° C. | — | — | — | — | — |
| | Presence/absence of metal impurities | | | | | Present | Present | Present | Present | Present |
| Insulating layer Evaluation | Enthalpy of fusion [J/g] | | | | | 88 | 89 | 90 | 89 | 88 |
| | Melting point [° C.] | | | | | 159 | 161 | 162 | 162 | 162 |
| | AC breakdown electric field strength [kV/mm] | | | | | 25 | 20 | 25 | 22 | 24 |

TABLE 7

| | | Molecular weight | Phenol number | Surrounding of hydroxyl group | Melting point | Sample 27 | 28 | 29 | 30 | 31 |
|---|---|---|---|---|---|---|---|---|---|---|
| Propylene-based resin (A) | Homo PP | | | — | | 75 | 75 | 75 | 75 | 75 |
| | Random PP | | | — | | — | — | — | — | — |
| Low-crystallinity resin (B) | EPR | | | — | | 25 | 25 | 25 | 25 | 25 |
| Styrene-based resin (C) | SEBS | | | — | | — | — | — | — | — |
| Resistance-imparting agent (D') | (d'1) | 512 | 1 | — | 106° C. | — | — | — | — | — |
| | (d'2) | 509 | 1 | — | 90° C. | — | — | — | — | — |
| | (d'3) | 358 | — | — | 63° C. | — | — | — | — | — |
| | (d'4) | 198 | — | — | 4° C. | — | — | — | — | — |
| | (d'5) | 390 | 1 | Hindered | 10° C. | — | — | — | — | — |
| | (d'6) | 108 | — | — | −15° C. | 6 | — | — | — | — |

TABLE 7-continued

| | | Molecular weight | Phenol number | Surrounding of hydroxyl group | Melting point | Sample | | | | |
|---|---|---|---|---|---|---|---|---|---|---|
| | | | | | | 27 | 28 | 29 | 30 | 31 |
| | (d'7) | 784 | 3 | Hindered | 220° C. | — | 5 | — | — | — |
| | (d'8) | 545 | 3 | One-hindered | 185° C. | — | — | 5 | — | — |
| | (d'9) | 120 | — | — | bp 202° C. | — | — | — | 9 | — |
| | (d'10) | 232 | — | — | 35° C. | — | — | — | — | 4 |
| | Presence/absence of metal impurities | | | | | Present | Present | Present | Present | Present |
| Insulating | Enthalpy of fusion [J/g] | | | | | 90 | 90 | 90 | 84 | 91 |
| layer | Melting point [° C.] | | | | | 162 | 161 | 161 | 159 | 162 |
| Evaluation | AC breakdown electric field strength [kV/mm] | | | | | 26 | 24 | 25 | 22 | 18 |

(Samples 1 to 6)

For sample 1, as shown in Table 2, 75 parts by mass of an isotactic propylene homopolymer (homo PP) as the polypropylene-based resin (A), 25 parts by mass of an ethylene-propylene rubber (EPR) as the low-crystallinity resin (B), and 6 parts by mass of a component (d1) shown in Table 1 as the resistance-imparting agent (D) were mixed. In addition, copper powder was added to the mixture so that the content thereof was 0.02% by volume of the resin composition. The mixture was then heat-mixed at 220° C. using a kneader to prepare a resin composition. For sample 2, the resin composition was prepared in the same manner as sample 1, except that the resistance-imparting agent (D) was not added. For samples 3 to 6, the resin composition was prepared in the same manner as sample 1, except that the addition amount of the component (d1) was changed to 0.3 parts by mass, 0.5 parts by mass, 9 parts by mass, or 12 parts by mass, respectively.

(Samples 7 to 15)

For samples 7 to 15, the resin compositions were prepared in the same manner as sample 1, except that the type of the resistance-imparting agent (D) was changed to (d2) to (d8) and the addition amount of the resistance-imparting agent was changed accordingly, as shown in Tables 3 and 4.

(Samples 16 to 18)

For samples 16 and 17, the resin composition was prepared in the same manner as sample 1, except that the type of the propylene-based resin (A) was changed from homo PP to random polypropylene (random PP) and the addition amount of the individual component was changed, as shown in Table 5. For sample 18, the resin composition was prepared in the same manner as samples 16 and 17, except that the resistance-imparting agent (D) was not added.

(Samples 19 to 21)

For samples 19 and 20, the resin composition was prepared in the same manner as sample 16, except that the styrene-based resin (C) was further added as the resin component and the addition amount of the individual component was changed accordingly, as shown in Table 5. For sample 21, the resin composition was prepared in the same manner as samples 19 and 20, except that the resistance-imparting agent (D) was not added.

(Samples 22 to 31)

For samples 22 to 31, the resin composition was prepared in the same manner as sample 1, except that components (d'1) to (d'10) were used as comparative components (D') in place of the resistance-imparting agents (D) and their addition amounts were changed accordingly, as shown in Tables 6 and 7.

(1-3) Preparation of Evaluation Samples

Next, each of the prepared samples 1 to 31 of the resin composition was press-molded at 220° C., and gradually cooled by water cooling under pressure, to prepare a sheet-like evaluation sample with a thickness of 0.4 mm. In the preparation of the evaluation sample, the resin composition was extruded so that the copper powder with a diameter of 200 μm or less was placed in the center of the sheet. For samples 18 and 21, the evaluation sample was prepared without placing copper powder.

(2) Evaluation

The prepared evaluation samples were evaluated for the following items.

(Melting Point and Enthalpy of Fusion)

The prepared evaluation samples were measured for the melting point and the enthalpy of fusion of the resin composition.

The melting point of each evaluation sample was determined by DSC measurement. The DSC measurement was performed according to JIS-K-7121 (1987). Specifically, DSC 8500 (a power compensation type) manufactured by PerkinElmer Inc. was used as a DSC apparatus. The reference sample was, for example, α-alumina. The mass of the evaluation sample was 8 to 10 g. In the DSC apparatus, the temperature was raised from room temperature (27° C.) to 220° C. at a rate of 10° C./min. Accordingly, a DSC curve was obtained by plotting endothermic amount per unit time (heat flow) against temperature.

In this case, the temperature at which an endothermic amount per unit time in the evaluation sample is maximum (highest peak) is defined as "melting point". In addition, for the DSC curve, the area of the region enclosed between the melting peak and the base line was determined to obtain "enthalpy of fusion".

(AC Breakdown Electric Field Strength)

The AC breakdown electric field strength was measured for the insulation of the prepared evaluation sample. The AC breakdown electric field strength was determined by AC breakdown test. Specifically, at an ordinary temperature (27° C.), the evaluation sample was subjected to a commercial frequency (e.g., 60 Hz) AC voltage under conditions of applying a voltage of 10 kV for 10 minutes, then repeating cycle of raising the voltage by 1 kV increment and applying the raised voltage for 10 minutes. An electric field strength at which a breakdown occurred in the evaluation sample was measured. In this example, those with the electric field strength of 45 kV/mm or more were evaluated as good.

(3) Evaluation Results

The results of the above-described evaluations for the evaluation samples are shown in Tables 2 to 7.

Regarding samples 1 to 6, samples 1, 4, and 5 in which the addition amount of the resistance-imparting agent (D) was 0.4 parts by mass to 10 parts by mass were observed to have higher AC breakdown electric field strength and excellent insulation, compared to sample 2 with no resistance-imparting agent (D) added thereto and sample 3 in which the addition amount of the resistance-imparting agent (D) was 0.3 parts by mass. It is probably because in the sample 1, 4, and 5, the metal impurities can be coated with the resistance-imparting agent (D), and the degradation of the insulation due to the metal impurities can be reduced. In sample 6, because the addition amount of the resistance-imparting agent (D) is excessive, as much as 12 parts by mass, the evaluation sample cannot be formed into a sheet, and the insulation cannot be evaluated.

In samples 1, 7 to 10, 13, and 15, the type of the resistance-imparting agent (D) was changed accordingly, but all of them were observed to have AC breakdown electric field strength and obtain a high insulation. Sample 10 was observed to obtain higher AC breakdown electric field strength compared to other samples. Accordingly, the one including a sulfur atom and a linear carbon structure having 5 or more and 10 or less carbon atoms in its chemical structure is found to be preferable as the resistance-imparting agent (D).

Further, samples 10 to 12 were observed to obtain a high insulation by appropriately setting the addition amount of the resistance-imparting agent (D), similar to samples 1 to 7.

Samples 16 and 17 was observed to increase the AC breakdown electric field strength compared to sample 1 that uses the homo PP, by using the random PP as the propylene-based resin. Further, samples 19 and 20 were observed to increase the AC breakdown electric field strength similar to samples 16 and 17, by adding the styrene-based resin together with the low-crystallinity resin to the propylene-based resin. In contrast, sample 18 and sample 21 with no resistance-imparting agent (D) added thereto were observed to have the AC breakdown electric field strength of less than 45 kV/mm due to the influence of the metal impurities, and have lower insulation than those of samples 16, 17, 19, and 20. In a case where the resin composition was similar to those of samples 18 and 21 and no copper powder was added, the AC breakdown electric field strength was 66 kV/mm and 68 kV/mm, respectively, and the desired insulation was observed to be obtained in the absence of the metal impurities.

As shown in Table 6, samples 22 to 31 were observed to have the molecular weight out of the range from 200 to 500, no phenol skeleton, steric hindrance occurring around the hydroxyl group, or significantly reduced insulation due to the use of comparative component (D') with the melting point of more than 215° C. It is probably because the comparative component (D') fails to sufficiently coat the surface of the metal impurities during the heat-mixing, or fails to sufficiently mitigate the change in resistance between the metal impurities and the resin component even when it can sufficiently coat.

As described above, it is confirmed that the addition of a predetermined amount of the resistance-imparting agent having a predetermined chemical structure, molecular weight, and melting point to the resin component including the propylene units can stably attain a high insulation in the insulating layer when the content of the metal impurities is within a range of 0.02% by volume or less.

Preferred Aspect of Disclosure

Hereinafter, supplementary descriptions of the preferred aspects of the present disclosure will be given.

Supplementary Description 1

A resin composition, including:
a resin component containing propylene units, and
a resistance-imparting agent,
wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less,
a content of the resistance-imparting agent is 0.4 parts by mass or more and 10 parts by mass or less with respect to 100 parts by mass of the resin component, and
a content ratio of metal impurities is 0.02% by volume or less.

Supplementary Description 2

A power cable, including:
a conductor, and
an insulating layer coated on an outer circumference of the conductor,
wherein the insulating layer is formed from a resin composition,
the resin composition includes a resin component containing propylene units, and a resistance-imparting agent,
the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less,
a content of the resistance-imparting agent is 0.4 parts by mass or more and 10 parts by mass or less with respect to 100 parts by mass of the resin component, and
a content ratio of metal impurities is 0.02% by volume or less.

Supplementary Description 3

The power cable according to supplementary description 2,
wherein the resin component contains at least one of ethylene units and styrene units.

Supplementary Description 4

The power cable according to supplementary description 2 or 3,
wherein the resistance-imparting agent has a melting point such that it becomes liquid at 27° C.

Supplementary Description 5

The power cable according to any one of supplementary descriptions 2 to 4,
wherein the resistance-imparting agent has a linear carbon structure having 5 or more and 10 or less carbon atoms.

Supplementary Description 6

The power cable according to any one of supplementary descriptions 2 to 5, wherein the resistance-imparting agent contains a sulfur atom.

Supplementary Description 7

The power cable according to any one of supplementary descriptions 2 to 6, wherein the resistance-imparting agent is a phenolic antioxidant.

Supplementary Description 8

The power cable according to any one of supplementary descriptions 2 to 7, wherein the resin composition includes as the propylene-based resin a propylene homopolymer having a melting point of 160° C. or more and 175° C. or less and an enthalpy of fusion of 100 J/g or more and 120 J/g or less, and the resin composition has a melting point of 158° C. or more and 168° C. or less and an enthalpy of fusion of 55 J/g or more and 110 J/g or less.

Supplementary Description 9

The power cable according to any one of supplementary descriptions 2 to 7, wherein the resin composition includes as the propylene-based resin a propylene random copolymer having a melting point of 140° C. or more and 155° C. or less and an enthalpy of fusion of 90 J/g or more and 105 J/g or less, and the resin composition has a melting point of 140° C. or more and 150° C. or less and an enthalpy of fusion of 55 J/g or more and 100 J/g or less.

Supplementary Description 10

A method of producing a power cable, including:

preparing a resin composition by mixing a propylene-based resin, a flexible component containing at least one of a low-crystallinity resin and a styrene-based resin, and a resistance-imparting agent; and coating an insulating layer around a conductor using the resin composition, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, and in the preparation of the resin composition, 0.4 parts by mass or more and 10 parts by mass or less of the resistance-imparting agent is added to 100 parts by mass of a resin component containing the propylene-based resin and the flexible component.

Supplementary Description 11

The method of producing a power cable according to supplementary description 10, wherein in the preparation of the resin composition, 55 parts by mass or more and 95 parts by mass or less of the propylene-based resin and 5 parts by mass or more and 45 parts by mass or less of the flexible component are mixed, with respect to a total of the propylene-based resin and the flexible component being 100 parts by mass.

Supplementary Description 12

The method of producing a power cable according to supplementary description 10 or 11, wherein the propylene-based resin is a propylene homopolymer having a melting point of 160° C. or more and 175° C. or less and an enthalpy of fusion of 100 J/g or more and 120 J/g or less, and in the preparation of the resin composition, the propylene-based resin and the flexible component are mixed so that the resin composition has a melting point of 158° C. or more and 168° C. or less and an enthalpy of fusion of 55 J/g or more and 110 J/g or less.

Supplementary Description 13

The method of producing a power cable according to supplementary description 10 or 11, wherein the propylene-based resin is a propylene random copolymer having a melting point of 140° C. or more and 155° C. or less and an enthalpy of fusion of 90 J/g or more and 105 J/g or less, and in the preparation of the resin composition, the propylene-based resin and the flexible component are mixed so that the resin composition has a melting point of 140° C. or more and 150° C. or less and an enthalpy of fusion of 55 J/g or more and 100 J/g or less.

REFERENCE SIGNS LIST

10 Power cable
110 Conductor
120 Internal semiconductive layer
130 Insulating layer
140 External semiconductive layer
150 Shielding layer
160 Sheath

The invention claimed is:

1. A resin composition, comprising:
a resin component containing propylene units, and
a resistance-imparting agent,
wherein the resin component comprises a propylene-based resin and a flexible component containing a low-crystallinity resin and a styrene-based resin,
wherein the low-crystallinity resin is a copolymer obtained by copolymerization of at least any two of ethylene, propylene, butene, hexene, and octene, and has no melting point or has a melting point of 100° C. or less,
wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

2. A power cable, comprising:

a conductor, and an insulating layer coated on an outer circumference of the conductor, wherein the insulating layer is formed from a resin composition, the resin composition comprises a resin component containing propylene units, and a resistance-imparting agent, wherein the resin component comprises a propylene-based resin and a flexible component containing a low-crystallinity resin and a styrene-based resin, wherein the low-crystallinity resin is a copolymer obtained by copolymerization of at least any two of ethylene, propylene, butene, hexene, and octene, and has no melting point or has a melting point of 100° C. or less, the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

3. The power cable according to claim 2, wherein the resistance-imparting agent has a linear carbon structure having 5 or more and 10 or less carbon atoms.

4. The power cable according to claim 2, wherein the resistance-imparting agent contains a sulfur atom.

5. The power cable according to claim 2, wherein the resistance-imparting agent has a melting point such that it becomes liquid at 27° C.

6. The power cable according to claim 2, wherein the resistance-imparting agent is a phenolic anti-oxidant.

7. The power cable according to claim 2, wherein the resin composition comprises as the propylene-based resin a propylene homopolymer having a melting point of 160° C. or more and 175° C. or less and an enthalpy of fusion of 100 J/g or more and 120 J/g or less, and the resin composition has a melting point of 158° C. or more and 168° C. or less and an enthalpy of fusion of 55 J/g or more and 110 J/g or less.

8. The power cable according to claim 2, wherein the resin composition comprises as the propylene-based resin a propylene random copolymer having a melting point of 140° C. or more and 155° C. or less and an enthalpy of fusion of 90 J/g or more and 105 J/g or less, and the resin composition has a melting point of 140° C. or more and 150° C. or less, and an enthalpy of fusion of 55 J/g or more and 100 J/g or less.

9. A resin composition, comprising:

a resin component containing propylene units, and a resistance-imparting agent, wherein the resin component comprises 55 to 95 parts by mass of a propylene-based resin, and 5 to 45 parts by mass of a flexible component containing a low-crystallinity resin and a styrene-based resin, wherein the resistance-imparting agent is a monomer having a phenol skeleton with hydrogen or an alkyl group having 1 to 3 carbon atoms, bonded to at least one of ortho positions to the hydroxyl group of the phenol skeleton, and has a melting point of 215° C. or less and a molecular weight of 200 or more and 500 or less, a content of the resistance-imparting agent is 0.4 parts by mass or more and 10 parts by mass or less with respect to 100 parts by mass of the resin component, and a content ratio of metal impurities is 0.02% by volume or less.

\* \* \* \* \*